(12) United States Patent
Yamamoto

(10) Patent No.: US 10,491,404 B1
(45) Date of Patent: Nov. 26, 2019

(54) SYSTEMS AND METHODS FOR CRYPTOGRAPHIC KEY GENERATION AND AUTHENTICATION

(71) Applicant: Hotpyp, Inc., Walnut Creek, CA (US)

(72) Inventor: Kelly Bryant Yamamoto, Concord, CA (US)

(73) Assignee: Hotpyp, Inc., Walnut Creek, CA (US)

( * ) Notice: Subject to any disclaimer, the term of this patent is extended or adjusted under 35 U.S.C. 154(b) by 0 days.

(21) Appl. No.: 16/406,842

(22) Filed: May 8, 2019

Related U.S. Application Data

(60) Provisional application No. 62/730,490, filed on Sep. 12, 2018.

(51) Int. Cl.
*H04L 29/06* (2006.01)
*H04L 9/32* (2006.01)
*H04L 9/14* (2006.01)
*H04L 9/30* (2006.01)

(52) U.S. Cl.
CPC .............. *H04L 9/3247* (2013.01); *H04L 9/14* (2013.01); *H04L 9/3073* (2013.01); *H04L 9/3297* (2013.01)

(58) Field of Classification Search
CPC ....... H04L 9/3247; H04L 9/14; H04L 9/3073; H04L 9/3297
See application file for complete search history.

(56) References Cited

U.S. PATENT DOCUMENTS

| | | | |
|---|---|---|---|
| 5,214,702 A | 5/1993 | Fischer | |
| 5,796,833 A * | 8/1998 | Chen | H04L 9/302 380/278 |
| 6,301,658 B1 | 10/2001 | Koehler | |
| 6,446,207 B1 * | 9/2002 | Vanstone | H04L 9/3066 380/30 |
| 7,243,366 B2 | 7/2007 | Medvinsky et al. | |
| 7,363,495 B2 | 4/2008 | Felt et al. | |
| 7,890,763 B1 * | 2/2011 | Law | G06Q 20/401 705/75 |

(Continued)

OTHER PUBLICATIONS

Denning et al., "Timestamps in Key Distribution Protocols," Communications of the ACM, Aug. 1981, vol. 24, No. 8, pp. 533-536.

(Continued)

*Primary Examiner* — Sarah Su
(74) *Attorney, Agent, or Firm* — Cooley LLP

(57) ABSTRACT

In some embodiments, a non-transitory processor-readable medium stores code representing instructions configured to be executed by a processor. The code includes code to cause the processor to receive, at a first compute device, (1) a message signed using a signature associated with a derived private key of a second compute device, and (2) an identifier. The code further includes code to cause the processor to retrieve, using the identifier, an ascendant public key associated with the second compute device. The code further includes code to cause the processor to generate, using a key derivation function with the ascendant public key and the identifier as inputs, a derived public key that is paired with the derived private key. The code further includes code to cause the processor to authenticate the second compute device by verifying the signature using the derived public key.

20 Claims, 11 Drawing Sheets

(56) References Cited

U.S. PATENT DOCUMENTS

| | | | | |
|---|---|---|---|---|
| 2001/0054143 | A1* | 12/2001 | Miyazawa | G06F 21/31 |
| | | | | 713/155 |
| 2003/0120925 | A1* | 6/2003 | Rose | G06Q 20/341 |
| | | | | 713/176 |
| 2005/0044351 | A1 | 2/2005 | Harvey | |
| 2005/0254656 | A1 | 11/2005 | Rose et al. | |
| 2012/0039474 | A1* | 2/2012 | Ho | H04L 9/0844 |
| | | | | 380/278 |
| 2013/0007471 | A1 | 1/2013 | Grab et al. | |
| 2014/0064480 | A1* | 3/2014 | Hartley | H04L 9/0866 |
| | | | | 380/30 |
| 2017/0141926 | A1* | 5/2017 | Xu | H04L 9/3247 |
| 2017/0171754 | A1* | 6/2017 | South | H04W 4/90 |
| 2017/0207917 | A1* | 7/2017 | Davis | H04L 9/3066 |
| 2017/0310489 | A1* | 10/2017 | Van Der Sluis | G09C 1/00 |
| 2018/0035293 | A1* | 2/2018 | Elnekaveh | H04L 9/14 |
| 2018/0270066 | A1* | 9/2018 | Doyon | H04W 12/06 |
| 2018/0288039 | A1* | 10/2018 | Haase | H04L 63/0853 |
| 2019/0012664 | A1* | 1/2019 | Viola | H04L 9/3268 |
| 2019/0020483 | A1* | 1/2019 | Meng | H04L 9/0897 |

OTHER PUBLICATIONS

"Hierarchical Deterministic Wallets," Github, 15 pages, last updated Oct. 25, 2018, https://github.com/bitcoin/bips/blob/master/bip-0032.mediawiki.

"Hierarchically Deterministic Wallets—The Concepts", Vault0x, Nov. 26, 2017, 9 pages, https://medium.com/vault0x/hierarchically-deterministic-wallets-the-concepts-3aa487e71235.

\* cited by examiner

SYSTEMS AND METHODS FOR CRYPTOGRAPHIC KEY GENERATION AND AUTHENTICATION

CROSS-REFERENCE TO RELATED APPLICATIONS

This application claims priority to and the benefit of U.S. Provisional Application No. 62/730,490, filed on Sep. 12, 2018 and titled "Method of Cryptographic Key Creation and Authentication," the disclosure of which is incorporated herein by reference in its entirety.

BACKGROUND

This application relates generally to the field of cryptography, and in particular, to systems and methods for key generation and authentication using cryptographic keys.

Some known systems allow compute devices to exchange information and/or messages using public and private key pairs. The sending compute device can encrypt a message using the receiving compute device's public key and can send the encrypted message to the receiving compute device. The receiving compute device can use its private key to decrypt the message. In some instances, the sending compute device can also cryptographically sign a message using the sending compute device's private key. The receiving compute device can verify the sending compute device's signature using the sending compute device's public key. In some known systems, a compute device uses the same public and private key pairs to exchange information with multiple different entities.

In some known systems, a user can use a username and password to authenticate to one or more relying parties. It, however, can be cumbersome to remember various usernames and passwords for multiple relying parties and/or unsecure to reuse the same username and password for multiple relying parties.

Thus, a need exists for a system and method that can generate multiple cryptographic keys that can be used for authentication with one or more relying parties.

SUMMARY

In some embodiments, a non-transitory processor-readable medium stores code representing instructions configured to be executed by a processor. The code includes code to cause the processor to receive, at a first compute device, (1) a message signed using a signature associated with a derived private key of a second compute device, and (2) an identifier. The code further includes code to cause the processor to retrieve, using the identifier, an ascendant public key associated with the second compute device. The code further includes code to cause the processor to generate, using a key derivation function with the ascendant public key and the identifier as inputs, a derived public key that is paired with the derived private key. The code further includes code to cause the processor to authenticate the second compute device by verifying the signature using the derived public key.

DETAILED DESCRIPTION

In some embodiments, a non-transitory processor-readable medium stores code representing instructions configured to be executed by a processor. The code includes code to cause the processor to receive, at a first compute device, (1) a message signed using a signature associated with a derived private key of a second compute device, and (2) an identifier. The code further includes code to cause the processor to retrieve, using the identifier, an ascendant public key associated with the second compute device. The code further includes code to cause the processor to generate, using a key derivation function with the ascendant public key and the identifier as inputs, a derived public key that is paired with the derived private key. The code further includes code to cause the processor to authenticate the second compute device by verifying the signature using the derived public key.

In some embodiments, an apparatus includes a memory and a processor operatively coupled to the memory. The processor is configured to generate a derived private key by inputting, to an internal key derivation function, a timestamp and an ascendant private key. The processor is configured to post an ascendant public key associated with the ascendant private key as related to the timestamp in a public ledger. The processor is configured to sign a message using a signature associated with the derived private key to define a signed message. The processor is configured to send the signed message and the timestamp to a relying compute device such that the relying compute device retrieves the ascendant public key from the public ledger using the timestamp, derives a derived public key that is paired with the derived private key, and uses the derived public key to authenticate the signature.

In some embodiments, a method includes receiving, at a first compute device, a request to authenticate a second compute device. The request can be or include, for example, (1) a message signed using a signature associated with a derived private key of the second compute device and (2) a timestamp. The method further includes retrieving, using the timestamp and from a public ledger associated with the second compute device, an ascendant public key associated with the second compute device. The method further includes generating, using a key derivation function with the ascendant public key as an input, a derived public key that is paired with the derived private key. The method further includes authenticating the second compute device by verifying the signature using the derived public key.

Figure 1:
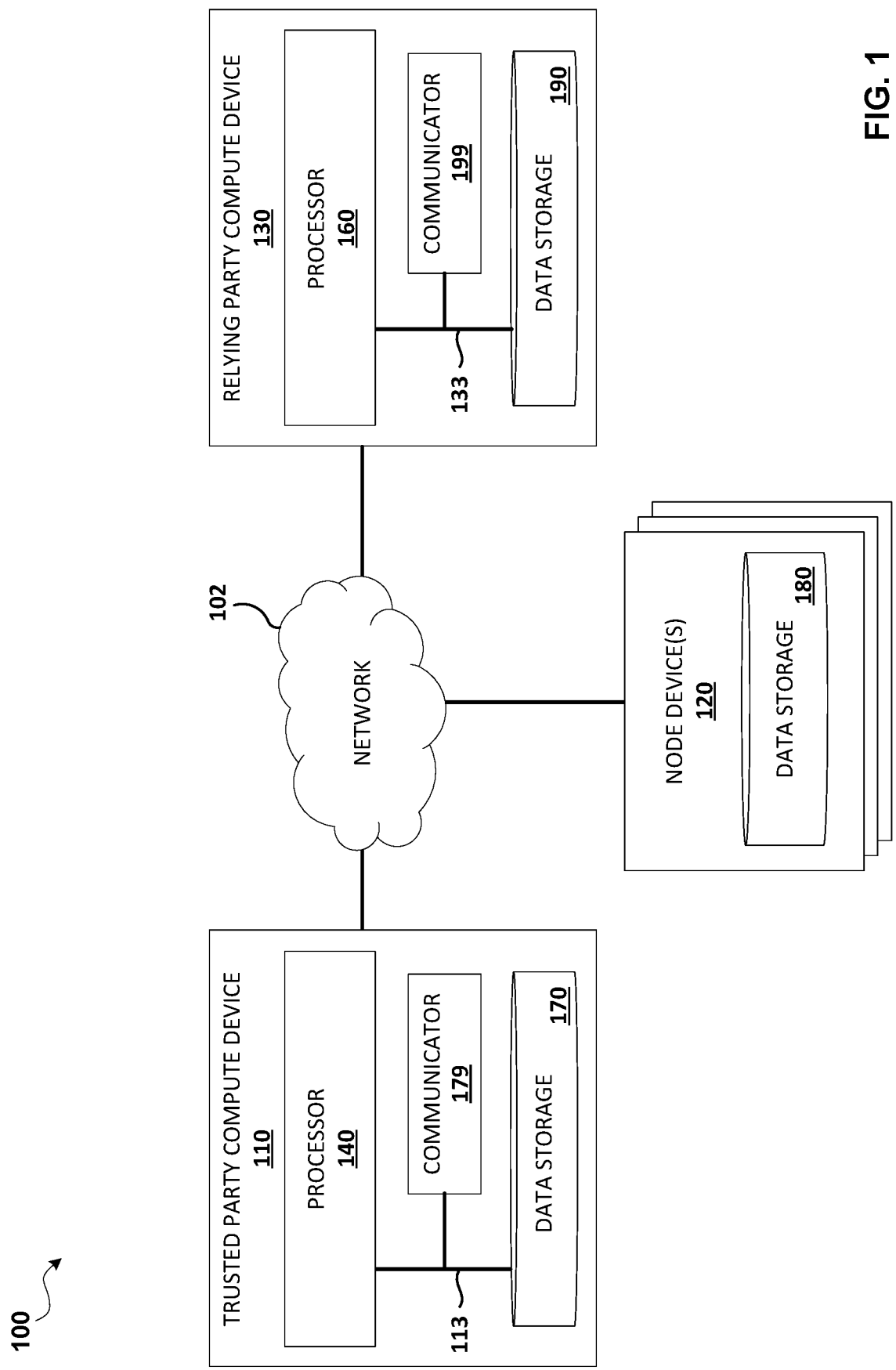
FIG. 1 is a schematic block diagram of a key generation and authentication system, according to an embodiment.

FIG. 1 is a schematic block diagram of a key generation and authentication system 100, according to an embodiment. As shown, the key generation and authentication system 100 includes a trusted party compute device 110, one or more node device(s) 120, and a relying party compute device 130, interconnected over network 102. While the key generation and authentication system 100 is shown as including three or more discrete devices, other arrangements can include any number of trusted party compute devices, node devices and/or relying party compute devices. For example, one or more of the node device(s) 120 can include one or more integrated compute devices, compute platforms, or the like.

Network 102 can be or include, for example, an intranet, a local area network (LAN), a personal area network (PAN), a wireless local area network (WLAN), a wireless personal area network (WPAN), a wide area network (WAN) such as the Internet, a metropolitan area network (MAN), a worldwide interoperability for microwave access network (Wi-MAX®), an optical fiber (or fiber optic)-based network, a Bluetooth® network, a virtual network, and/or any combination thereof. Network 102 can include wired, wireless, or fiber optic connections. Network 102 can otherwise be include or use any combination of connections and protocols configured to support communications between the trusted party compute device 110, one or more of the node device(s) 120, and the relying party compute device 130.

The trusted party compute device 110, one or more of the node device(s) 120, and/or the relying party compute device 130 each respectively and individually represent or can otherwise include any suitable compute device, compute system, or compute platform. For example, the trusted party compute device 110, one or more of the node device(s) 120, and/or the relying party compute device 130 can be or include a mobile phone, a smart phone, a tablet computer, a laptop computer, a personal or desktop computer, a server (e.g., database server), a virtual machine, and/or the like. The trusted party compute device 110, one or more of the node device(s) 120, and/or the relying party compute device 130 can otherwise be or include any other suitable type of computing device or apparatus, computing system, computing platform, information system, or information content processing device, capable of enabling communications between devices including, for example, the trusted party compute device 110, one or more of the node device(s) 120, and/or the relying party compute device 130, in accordance with embodiments of the present disclosure.

The trusted party compute device 110 includes processor 140, communicator 179, and data storage 170. The trusted party compute device 110 can be configured to implement any suitable combination of devices and technologies, such as network devices and device drivers, to support the operation of the processor 140, the communicator 179, and/or the data storage 170, and provide a platform enabling communications (e.g., via network 102) between the trusted party compute device 110 and one or more of the node device(s) 120 and/or the relying party compute device 130, in accordance with embodiments described herein.

The processor 140 can be or include, for example, a hardware-based integrated circuit (IC) and can be or include any suitable processing device configured to run and/or execute a set of instructions or code. For example, the processor 140 can be or include a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), and/or the like. The processor 140 can be operatively coupled to the data storage 170, such as via system bus 113. The system bus 113 can include any suitable type of bus, such as an address bus, data bus, control bus, and/or the like.

Figure 2:
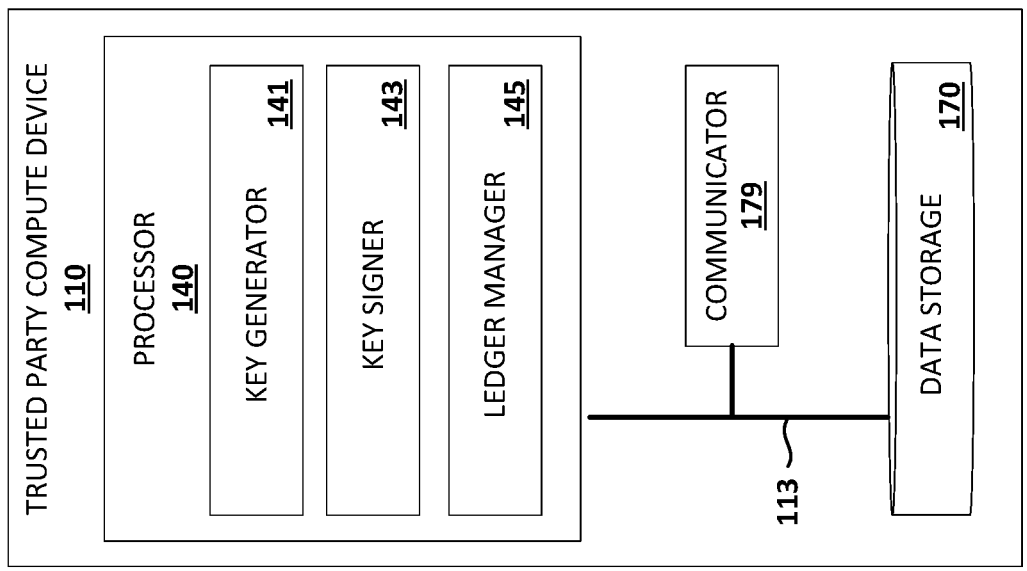
FIG. 2 is a schematic block diagram of a trusted party compute device of the key generation and authentication system, as shown in FIG. 1, according to an embodiment.

FIG. 2 is a schematic block diagram of the trusted party compute device 110 of the key generation and authentication system 100, as shown in FIG. 1, according to an embodiment. As shown in FIG. 2, the processor 140 includes and/or is configured to execute key generator 141, key signer 143, and/or ledger manager 145.

The key generator 141, the key signer 143, and/or the ledger manager 145 can be software stored in data storage 170 (or other memory) and executed by processor 140 (e.g., code to cause the processor 140 to execute the key generator 141, the key signer 143, and/or the ledger manager 145 can be stored in the data storage 170) and/or a hardware-based device such as, for example, an ASIC, an FPGA, a CPLD, a PLA, a PLC and/or the like. For example, the key generator 141, the key signer 143, and/or the ledger manager 145 can be or include software or code (collectively, "code") representing instructions configured to be executed by a processor (e.g., processor 140). The code can be stored in or by a memory (e.g., data storage 170) of a compute device (e.g., trusted party compute device 110). The code representing the instructions can otherwise include any suitable type or form of machine- or processor-executable code, in accordance with embodiments described herein.

The key generator 141 can be configured to generate or produce linked or associated cryptographic keys. For example, the key generator 141 can be configured to implement one or more key derivation functions to generate one or more derived keys based on a root key. The root key can be or include, for example, a root, ascendant, or parent key ("root key(s)", "ascendant key(s)", or "parent key(s)", respectively). One or more of the derived keys can be or include, for example, one or more derived, descendent, or child keys (collectively, "derived key(s)" or "descendent key(s)" or "child key(s)").

For example, the key generator 141 can be configured to selectively implement one or more key derivation functions to generate a derived key based on a root key (e.g., based on a desired or intended use of the derived key to be generated). An intended use, or trusted party key usage, of a derived key can be, for example, to represent an identity of an entity, subject, person, user, or trusted party (collectively, "trusted party(ies)"), and further, to provide for authentication, integrity, and/or non-repudiation of the identity, or relying party key usage, as such can be used, for example, in an interaction or transaction between the trusted party and a relying party, such as described herein.

In some implementations and as described in further detail herein, one or more of the key derivation functions can be or include, for example, an internal hardened child key derivation function or an internal normal child key derivation function ("internal key derivation function"), or an external child key derivation function ("external key derivation function"), or a symmetric key derivation function ("symmetric key derivation function"). The key derivation functions can additionally or otherwise include any other suitable key derivation function, public key cryptography algorithm or function, hash function, or the like, in accordance with embodiments described herein.

As an example, in use, the key generator 141 can be configured to generate a derived private key by input, to a key derivation function, of an identifier and an ascendant private key (e.g., paired with the ascendant public key). In some implementations, the key derivation function can be or include, for example, an internal key derivation function or an external key derivation function. In some implementations, the identifier can be or include, for example, a timestamp, a transaction number or identifier, a serial number, and/or any other suitable identifier. The ascendant public key can be or include, for example, a public root key or a public parent key from which the derived private key can be generated (e.g., by a relying party). Similarly, the ascendant private key can be or include, for example, a private root key or a private parent key from which the derived private key is directly generated. An ascendant public key can be a public key that is used to produce one or more descendant child public keys that can be used to represent an identity (e.g., in an interaction or transaction with a relying party), as described herein.

In some instances, the ascendant public key, the ascendant private key, and/or the ascendant public key can include an associated chain code. For example, the ascendant public key can be associated with an associated ascendant chain code (e.g., upon generation). The chain code for each key of a key pair (e.g., ascendant public key and ascendant private key of an ascendant key pair) can be identical. For example, the ascendant public key and the ascendant private key can be generated so as to include or be extended by an (e.g., identical) additional 256 bits of entropy. The chain code can be or include, for example, a string or sequence of 32 bits or bytes (e.g., appended to each key of a key pair). In some instances, the chain code can be generated as an output of a key derivation function. Similarly stated, in some instances certain bits of an output of a key derivation function can be the derived key and other bits of the output of the key derivation function can be the chain code associated with that key. In such instances, the ascendant chain code that is generated with the ascendant public and/or private key (e.g., from a key derivation function) can be used as an input to generate a derived public and/or private key from the ascendant public and/or private key, as shown and described with respect to FIGS. 8-10. The chain code can thus link an ascendant key with its descendent keys.

The timestamp can include any suitable integer representation of, corresponding to, or associated with a specific point, instance, or period in time (collectively, "instance(s) in time" or "time"). In some instances, the timestamp can be an integer representation (e.g., integer value) that is measured or otherwise determined with respect to a reference in time. In some implementations, the timestamp can be, for example, a clock value, or an integer representation of a time at which a derived private key is generated (e.g., by key generator 141). For example, the timestamp can be an integer representation or (clock) value stated in terms of a duration or elapsed amount of time that is measured in seconds, milliseconds, microseconds, etc., from a predetermined starting or preceding point in time.

In some implementations, inputting a timestamp to a key derivation function to generate a derived private key includes, for example, executing a timestamping system or technique, such as Unix Epoch time, Unix time, Portable Operating System Interface (POSIX) time, or the like. In such implementations, the timestamp can be or include, for example, a 32-bit integer representation of a specific point or instance in time. The timestamping system or technique can otherwise be or include any suitable incrementing method, such as a continually incrementing method, or the like, that can be represented by an integer (e.g., an integer value) or converted to an integer of any size (e.g., 32-bit, 64-bit, 96-bit), in accordance with embodiments of the present disclosure.

In some implementations, inputting a timestamp to the key derivation function to generate the derived private key can include, for example, combining or amalgamating the timestamp with an ascendant private key (e.g., paired with an ascendant public key) to derive the derived private key (e.g., using a predefined hash algorithm or method). For example, in some instances, a timestamp can be input (with an ascendant private key) to a key derivation function to thereby generate the derived private key as a function of the timestamp (and an ascendant private key). Since the derived private key (e.g., a value of the derived private key) is generated so as to be dependent on the timestamp (e.g., a time at which the derived private key is generated), the timestamp cannot be separated, altered, or otherwise dissociated from the derived private key without also changing the value of the derived private key.

That is, every new timestamp that is applied to the same parent key (e.g., a root key, a parent key) and chain code will produce a unique child key (e.g., a derived private key). As such, the timestamp can be used, for example, as a variable input (e.g., to a key derivation function) by which to produce multiple different child keys from the same parent key.

For example, a cryptographic key (e.g., the derived private key in this instance) can be generated as a function of the timestamp of its initial generation. For example, the cryptographic key can be generated with a value that is dependent on a value of the timestamp, where the timestamp is a variable input (e.g., to the key derivation function) that is used, along with one or more fixed inputs (e.g., including an ascendant private key) to produce or generate one or more new child keys (e.g., including the derived private key). As such, one or more descendent keys can be generated from a common ascendant key (e.g., including the ascendant private key). Depending on the intended application of the key that is derived, the timestamp used as input to its generation can be originated by either the trusted party or by the relying party, as described in further detail herein.

The key signer 143 can be configured to sign a message, using a signature associated with the derived private key (e.g., generated via key generator 141), to define a signed message. In some implementations, the signed message can be signed using a signature associated with the derived private key. For example, after generating (e.g., via key generator 141) a derived key, the derived key can be used (e.g., by a trusted party), for example, to sign a message and thereby define a signed message. The signed message can be sent (e.g., by the trusted party) to an intended recipient (e.g., a relying party) with the assurance (e.g., to the relying party or another party) that the signed message was signed by the trusted party using the signature associated with the derived private key. Accordingly, the signed message can be subject to external authentication and verification (e.g., by or for the relying party) to ensure legitimacy of the signed message, as described in further detail herein. Generally, the signed message can be signed using any type of key signature, applied using any suitable signature or signing process or technique.

The ledger manager 145 is configured to post, such as in a ledger (e.g., owned or controlled by a trusted party), an ascendant public key. In some implementations, the ledger manager 145 is configured to post the ascendant public key with an associated identifier (e.g., timestamp). For example, the ascendant public key can be posted in the ledger in association with an identifier, such as for (later) retrieval by a relying party (e.g., with which the trusted party is or will transact or interact) from the ledger using the timestamp. Once retrieved, the relying party can use the ascendant public key to generate (e.g., by derivation from the ascendant public key) an associated, linked, paired, or otherwise related derived public key. Accordingly, the derived public key (generated based on the retrieved ascendant public key and the timestamp) can be used, such as by the relying party, to, for example, authenticate a signature (of or from the trusted party), such as can be attached to a signed message (e.g., generated by key signer 143), or the like, as described in further detail herein.

As another example, the ascendant public key and the timestamp can include the ascendant public key (or associated private key) and/or the timestamp used to generate (e.g., by key generator 141) the derived private key (e.g., by input of the ascendant public key (or associated private key) and the timestamp to a key derivation function). In some implementations, the public ledger is configured to store a set of ascendant public keys associated with a compute device (e.g., trusted party compute device 110) or a user (e.g., a trusted party) of the trusted party compute device 110. In some implementations, each ascendant public key from the set of ascendant public keys is associated with a unique and associated identifier (e.g., timestamp). In some implementations, the ledger can be or include, for example, a public ledger, a public ascendant ledger, and the like ("ascendant key ledger" or "public ledger" or "ascendant key ledger" or "ledger"). The ascendant public key can include or be associated with, for example, an ascendant key from which an associated derived private key is generated (e.g., via key generator 141).

The communicator 179 can be a hardware device operatively coupled to the processor 140 and the data storage 170 and/or software stored in the data storage 170 and executed by the processor 140. For example, the communicator 179 can be a network interface card (NIC), a Wi-Fi™ module, a Bluetooth® module and/or any other suitable wired and/or wireless communication device, in accordance with embodiments disclosed herein.

Furthermore, the communicator 179 can include a switch, a router, a hub and/or any other network device. The communicator 179 can be configured to connect or interconnect the trusted party compute device 110 to one or more compute devices over a communication network (e.g., network 102). In some implementations, the communicator 179 can be configured to send, in conjunction with the processor 140, a signed message and an associated timestamp to a compute device such as a relying compute device such that the relying compute device can retrieve the ascendant public key from a ledger (e.g., public ledger) using the timestamp.

The data storage 170 can be or include, for example, a random access memory (RAM), a memory buffer, a hard drive, a read-only memory (ROM), an erasable programmable read-only memory (EPROM), a portable memory (e.g., a flash drive, a portable hard disk, and/or the like), and/or the like. The data storage 170 can be configured to store, for example, one or more software modules and/or code, including instructions to cause the processor 140 to perform one or more processes, functions, and/or the like (e.g., the key generator 141, the key signer 143, and/or the ledger manager 145). While shown in FIGS. 1 and 2 as being part of the trusted party compute device 110, in some embodiments, the data storage 170 can alternatively or otherwise include, for example, one or more data storage(s) (e.g., data storage 180), residing on or hosted by a remote compute device (e.g., node 120) such as a remote database server, or the like, configured to operatively couple (e.g., via network 102) with trusted party compute device 110. In some implementations, the data storage 170 can be configured to store, for example, keys such as derived private keys (e.g., generated via key generator 141). In some implementations, the data storage 170 can be configured to store, for example, a ledger such as a ledger (e.g., owned or controlled by a trusted party).

Figure 3:
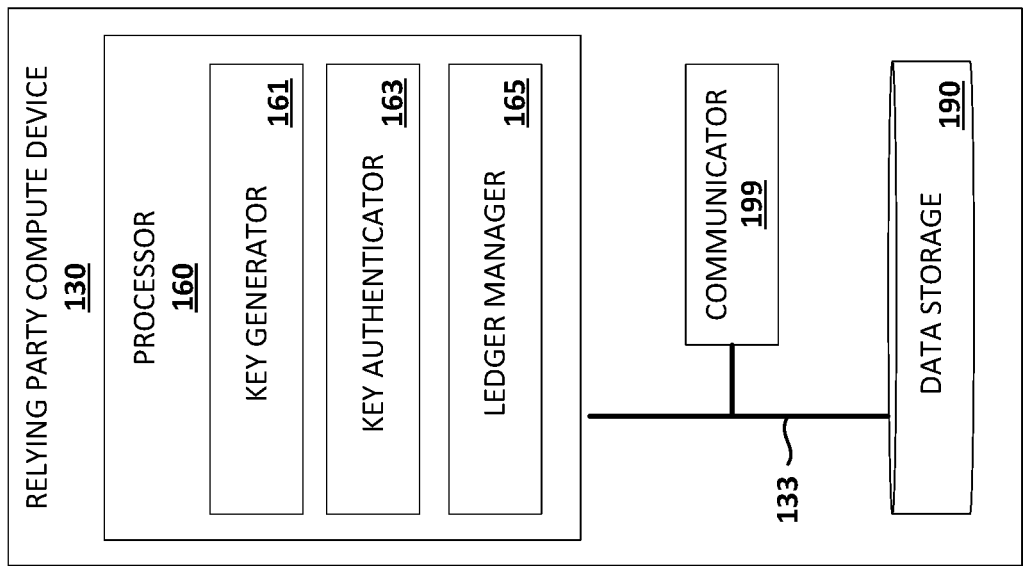
FIG. 3 is a schematic block diagram of a relying party compute device of the key generation and authentication system, as shown in FIG. 1, according to an embodiment.

As shown in FIGS. 1 and 3, the relying party compute device 130 includes processor 160, communicator 199, and data storage 190. The relying party compute device 130 can be configured to implement any suitable combination of devices and technologies, such as network devices and device drivers, to support the operation of the processor 160, the communicator 199, and the data storage 190, and provide a platform enabling communications (e.g., via network 102) between the relying party compute device 130 and one or more of the node device(s) 120 and/or the trusted party compute device 110, in accordance with embodiments disclosed herein. The relying party associated with the relying party compute device 130 can be or include, for example, any entity, subject, person, user, or third party with which a trusted party (e.g., using trusted party compute device 110) may transact or otherwise interact.

The processor 160 can be or include, for example, a hardware-based integrated circuit (IC) and can be or include any suitable processing device configured to run and/or execute a set of instructions or code. For example, the processor 160 can be structurally and/or functionally similar to the processor 140, as described herein. The processor 160 can be operatively coupled to the data storage 190, such as via system bus 133. The system bus 133 can include any suitable type of bus, such as an address bus, data bus, control bus, or the like.

FIG. 3 is a schematic block diagram of the relying party compute device 130 of the key generation and authentication system 100, as shown in FIG. 1, according to an embodiment. As shown in FIG. 3, the processor 160 includes and/or is configured to execute key generator 161, key authenticator 163, and/or ledger manager 165.

Each of the key generator 161, the key authenticator 163, and/or the ledger manager 165 can be software stored in data storage 190 and executed by processor 160 (e.g., code to cause the processor 160 to execute the key generator 161, the key authenticator 163, and/or the ledger manager 165 can be stored in the data storage 190) and/or a hardware-based device such as, for example, an ASIC, an FPGA, a CPLD, a PLA, a PLC and/or the like. For example, the key generator 161, the key authenticator 163, and/or the ledger manager 165 can be or include software or code (collectively, "code") representing instructions configured to be executed by a processor (e.g., processor 160). The code can be stored in or by a memory (e.g., data storage 190) of a compute device (e.g., relying party compute device 130), in a processor- or machine-readable medium, and/or the like. The code representing the instructions can otherwise include any suitable type or form of machine- or processor-executable code, as described herein.

The key generator 161 can be configured to generate or produce linked or associated cryptographic keys. In some implementations, the key generator 161 can be configured to generate, using a key derivation function with an ascendant public key and an identifier as inputs, a derived public key. For example, in some implementations, the key generator 161 can be configured to receive (1) a message signed using the signature associated with a derived private key of a trusted party compute device 110 and (2) an identifier. The message can be, for example, a message signed by the trusted party compute device 110 via the key signer 143, such as described with reference to FIG. 2. In some implementations, the identifier can be used to obtain an ascendant public key. Based on the ascendant public key and the identifier, the key generator 161 can generate or produce a derived public key. In some implementations, the key derivation function can be an external key derivation function.

In some implementations, the key authenticator 163 can be configured to authenticate a compute device (e.g., trusted party compute device 110) by verifying a signature using a derived public key (e.g., generated by key generator 161). The signature can be or include the signature associated with the derived private key (e.g., generated via key generator 141) that was used (e.g., by key generator 141) to define the signed message. In some implementations, the key authenticator 163 can be configured to authenticate and verify one or more of an identity of the compute device (e.g., trusted party compute device 110) and/or an authenticity of the signature. In some implementations, the key authenticator 163 can be configured to grant the second compute device access to resources in response to authenticating the second compute device using the derived public key.

In some implementations, the ledger manager 165 can be configured to retrieve, using the identifier (e.g., received by key generator 161), an ascendant public key associated with the second compute device (e.g., trusted party compute device 110). For example, in some implementations, the ledger manager 165 can be configured to retrieve the ascendant public key from a ledger. In some implementations, the ledger can be or include, for example, a key ledger, a public ledger, a public key ledger, or the like. In some implementations, the ledger can include a set of ascendant public keys. Each ascendant public key from the set of ascendant public keys can be associated with a different identifier than the remaining ascendant public keys from the set of ascendant public keys. For example, the ledger can be owned, operated, and/or maintained by the trusted party compute device 110 or by a user of the trusted party compute device 110. As such, the set of ascendant public keys may belong to or be associated with the trusted party compute device 110 or to the user of the trusted party compute device 110.

The communicator 199 can be a hardware device operatively coupled to the processor 160 and the data storage 190 and/or software stored in the data storage 190 and executed by the processor 160. For example, the communicator 199 can be or include a hardware device and/or any other suitable wired and/or wireless communication device, similar to the communicator 179, and can have component(s) that are functionally and/or structurally similar to those of the communicator 179 described herein. The communicator 199 can be configured to connect or interconnect the relying party compute device 130 to one or more compute devices over a communication network (e.g., network 102).

The data storage 190 can be or include, for example, one or more devices or components such as the data storage 170. For example, the data storage 190 can be configured to store one or more software modules and/or code, including instructions to cause the processor 160 to perform one or more processes, functions, and/or the like (e.g., the key generator 161, the key authenticator 163, and/or the ledger manager 165). While shown in FIGS. 1 and 3 as being part of the relying party compute device 130, in other embodiments, the data storage can alternatively or otherwise include, for example, one or more data storage(s) (e.g., data storage 180), residing on or hosted by a remote compute device (e.g., node 120) such as a remote database server, or the like, configured to operatively couple (e.g., via network 102) with the relying party compute device 130.

Figure 4:
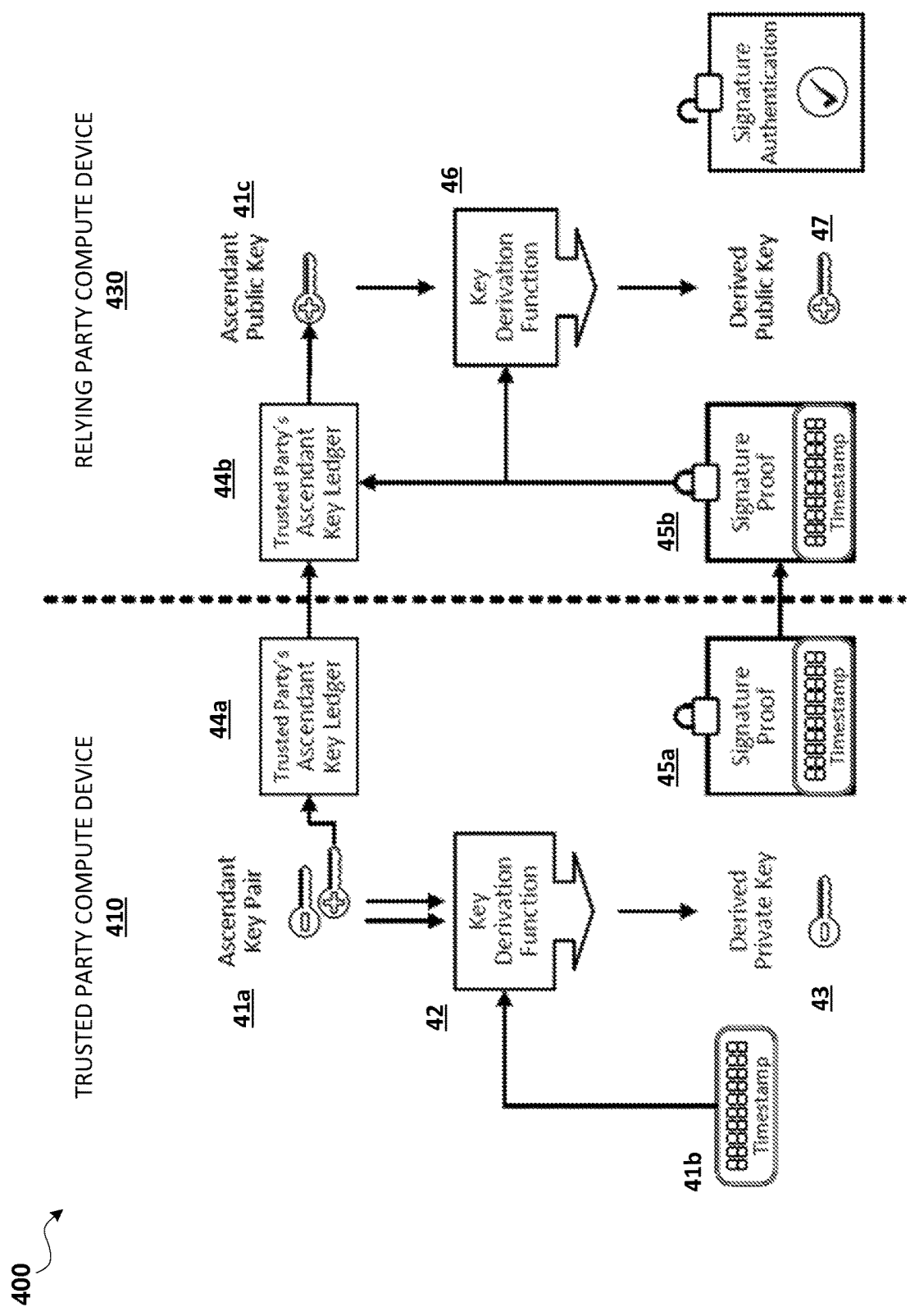
FIG. 4 is a flowchart depicting an authentication method, in accordance with an embodiment.

FIG. 4 is a flowchart depicting an authentication method 400 ("method 400"), in accordance with an embodiment. The method 400 can be implemented by compute devices including, for example, trusted party compute device 410 and relying party compute device 430. The method 400 allows a relying party compute device 430 to authenticate a trusted party compute device 410 such as in a transaction, as described herein. The relying party compute device 430 and the trusted party compute device 410 can be structurally and/or functionally similar to the relying party compute device 130 and the trusted party compute device 110, respectively, shown and described with respect to FIGS. 1-3. For example, the relying party compute device 430 and the trusted party compute device 410 can each be respectively configured to implement the method 400 via a processor (e.g., 140, 160, respectively).

In the method 400, the trusted party compute device 410 can be configured (e.g., at processor 140) to generate (e.g., via key generator 141) a pair of keys, or key pair ("key pair"), including, for example, ascendant key pair 41a. In some instances, the ascendant key pair 41a can be or include, for example, an ascendant public key and an ascendant private key. The ascendant key pair 41a can be generated, for example, via public-key cryptography, asymmetric cryptography, and/or the like. For example, the key pair can be generated via elliptic curve cryptography.

In the method 400, the trusted party compute device 410 can be configured (e.g., at processor 140) to generate (e.g., via key generator 141), via a key derivation function such as key derivation function 42, one or more extended keys, including, for example, one or more child or descendent keys ("child key(s)" or "descendent key(s)"). One or more of the descendent keys can be or include, for example, derived private key 43. For example, the derived private key 43 can be generated by input of (i) the ascendant private key from the ascendant key pair 41a and (ii) an identifier such as identifier 41b to the key derivation function 42, as described in further detail herein. The identifier 41b can be or include, for example, any suitable type of identifier, such as a clock value, timestamp, or the like. In some implementations, the input can be or include, for example, the ascendant private key, the identifier 41b, and an associated chain code, as described herein. In some implementations, the derived private key 43 can be generated as a function of the ascendant private key and the identifier 41b such that the derived private key 43 is immutably associated with the identifier 41b upon generation. In some implementations, each ascendant public key of the one or more child or descendent keys can be associated with a different or unique timestamp than the remaining ascendant public keys from the plurality of ascendant public keys.

In the method 400, the trusted party compute device 410 can be configured (e.g., at processor 140) to enable a user (e.g., at trusted party compute device 410) in providing a message used for authentication, integrity, and/or non-repudiation of an object such as an identity of the user, such as in an interaction or transaction between the user (e.g., the trusted party) and another user, or relying party (e.g., at relying party compute device 430). In the method 400, the trusted party compute device 410 can be configured to sign (e.g., via key signer 143) or otherwise apply, via the derived private key 43, a signature to an object such as object 45a. The object 45a can be or include, for example, a message, or the like.

For example, the trusted party compute device 410 can be configured to combine the message with the derived private key 43 to generate a signature such as a digital signature, signature proof, and/or the like. Upon signing the object 45a, the trusted party compute device 410 can send (e.g., via communicator 179) the object 45a over a network (e.g., network 102) to the relying party (e.g., at relying party compute device 430), such that the relying party receives, for example, object 45b. The object 45b can include a message corresponding to the message associated with the object 45a. The trusted party compute device 410 can also provide the identifier 41b to the relying party compute device 430 (e.g., via network 102).

In the method 400, the trusted party compute device 410 can be configured (e.g., at processor 140) to post or otherwise record (e.g., via ledger manager 145) the ascendant public key of the ascendant key pair 41a in or to a ledger, such as trusted party's ascendant key ledger 44a. The ascendant public key can be posted to the trusted party's ascendant key ledger 44a for retrieval and use by a relying party (e.g., at relying party compute device 130). For example, the ascendant public key can be posted to the ledger in association with the identifier 41b. As another example, the ascendant public key can be posted to the ledger with the identifier 41b and the ascendant chain code (e.g., identical and corresponding to the chain code of the ascendant private key, as described in further detail herein with reference to FIGS. 8-13). The ledger can include any suitable type of ledger (e.g., public ledger, distributed ledger), such as may reside or be hosted or stored on or by one or more node devices (e.g., node devices 120) and/or the trusted party compute device 410.

In the method 400, the relying party compute device 430 can be configured (e.g., at processor 160) to receive (e.g., via communicator 199) the object 45b (e.g., corresponding to the object 45a). For example, the object 45b can include a message corresponding to the message associated with the object 45a. In the method 400, the relying party compute device 430 can be configured (e.g., at processor 160) to retrieve (e.g., via ledger manager 165) the ascendant public key 41c from trusted party's ascendant key ledger 44b. The trusted party's ascendant key ledger 44b can be or include a ledger corresponding to the trusted party's ascendant key ledger 44b. The ascendant public key 41c can be retrieved based on the identifier 41b. Specifically, because the ascendant public key 41c is posted and/or stored in the trusted party's ascendant key ledger 44b as associated with the identifier, the relying party compute device 430 can use the identifier to look-up and retrieve the ascendant public key 41c from the trusted party's ascendant key ledger 44b. In some instances, the ascendant public key 41c can be retrieved based on the identifier 41b and/or the chain code.

In the method 400, the relying party compute device 430 can be configured (e.g., at processor 160) to generate (e.g., via key generator 161), via a key derivation function such as key derivation function 46, one or more extended keys (e.g., child keys), including, for example, derived public key 47. For example, the derived public key 47 can be generated by input of (i) the ascendant public key 41c and (ii) the identifier 41b (e.g., the timestamp), to the key derivation function 46, as described in further detail herein.

In the method 400, the relying party compute device 430 can be configured (e.g., at processor 160) to authenticate, verify, or determine a legitimacy (e.g., via key authenticator 163) of the object 45b with respect to the applied signature using the derived public key 47 (which is the public key corresponding to the derived private key 43). For example, the relying party compute device 430 can be configured to use the derived public key 47 to determine a legitimacy of the signature associated with the message signed by the derived private key 43 using the derived public key 47 (e.g., via key authenticator 163). In response to successful authentication (e.g., of the object 45b), the relying party compute device 430 can be configured to, for example, grant access (e.g., at trusted party compute device 410) to a secured resource, or the like. The relying party compute device 430 can alternatively or otherwise be configured in any suitable manner.

In some implementations, the processor (e.g., processor 140) can be configured to generate a second derived private key (e.g., such as derived private key 43) by inputting, to a key derivation function such as an internal key derivation function, a second identifier (e.g., such as identifier 41b) such as a second timestamp and the ascendant private key (e.g., such as of ascendant key pair 41a). In some implementations, the processor can be configured to post the ascendant public key as related to the second timestamp in the public ledger. In some implementations, the processor (e.g., processor 160) can be configured to sign a second message using a signature associated with the second derived private key to define a second signed message, the processor is configured to send the second signed message and the second timestamp to a second relying compute device (not shown in FIG. 4) such that the second relying compute device retrieves the ascendant public key from the public ledger using the second timestamp, derives a second derived public key that is paired with the second derived private key, and uses the second derived public key to authenticate the signature associated with the second derived private key. In such an implementation, the same ascendant public key can be used to derive multiple descendent keys that can be used to authenticate the trusted party compute device 410 to multiple different relying party compute devices.

Figure 5:
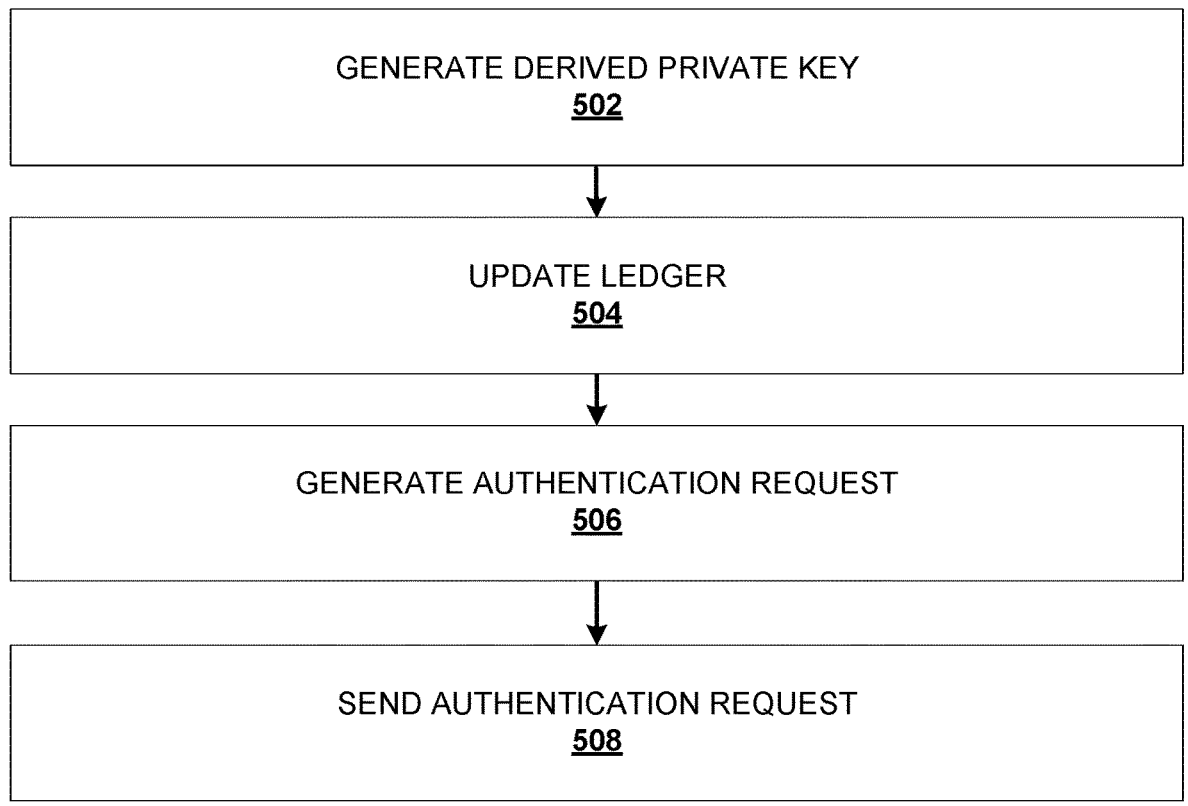
FIG. 5 is a flowchart depicting an authentication method from the perspective of a trusted party compute device of a key generation and authentication system, in accordance with an embodiment.

FIG. 5 is a flowchart depicting an authentication method from the perspective of a trusted party compute device (e.g., 110 of FIG. 1) of a key generation and authentication system (e.g., 100 of FIG. 1), in accordance with an embodiment. The compute device can be or include, for example, an apparatus including a memory (e.g., 170), and a processor (e.g., 140) operatively coupled to the memory.

At 502, the processor is configured to generate a derived private key by inputting to an internal key derivation function a timestamp (or other identifier) and an ascendant private key. At 504, the processor is configured to update a ledger by posting an ascendant public key paired with the ascendant private key as related to the timestamp in a public ledger. At 506, the processor is configured to generate an authentication request by signing a message using a signature associated with the derived private key to define a signed message. At 508, the processor is configured to send the authentication request including the signed message and the timestamp to a relying compute device such that the relying compute device retrieves the ascendant public key from the public ledger using the timestamp, derives a derived public key that is paired with the derived private key, and uses the derived public key to authenticate the signature.

Figure 6:
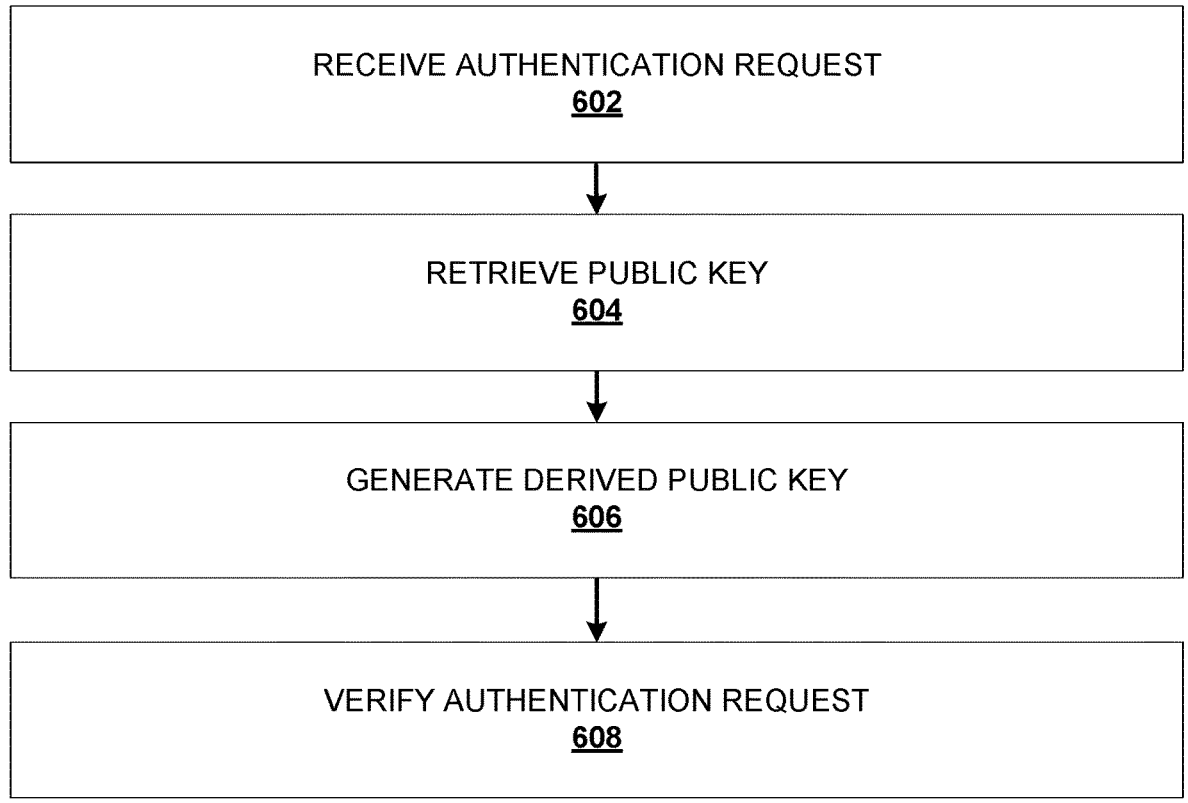
FIG. 6 is a flowchart depicting an authentication method from the perspective of a relying party compute device of a key generation and authentication system, in accordance with an embodiment.

FIG. 6 is a flowchart depicting an authentication method from the perspective of a relying party compute device (e.g., 130 of FIG. 1) of a key generation and authentication system (e.g., 100 of FIG. 1), in accordance with an embodiment. The compute device can be or include, for example, an apparatus including a memory (e.g., 190), and a processor (e.g., 160) operatively coupled to the memory. In some implementations, the memory includes a non-transitory processor-readable medium storing code representing instructions configured to be executed by the processor.

The code can be executed to cause the processor to receive, at 602, an authentication request including an identifier and the message signed using the signature associated with a derived private key of a second compute device (e.g., 110). At 604, the processor is configured (e.g., via execution of the code) to retrieve, using the identifier, an ascendant public key associated with the second compute device. At 606, the processor is configured (e.g., via execution of the code) to generate, using a key derivation function with the ascendant public key and the identifier as inputs, a derived public key that is paired with the derived private key. At 608, the processor is configured (e.g., via execution of the code) to authenticate the second compute device by verifying the signature using the derived public key. The relying party compute device can then provide the second compute device (e.g., the trusted party compute device) with access to resources and/or services associated with the relying party authenticating the second compute device.

Figure 7:
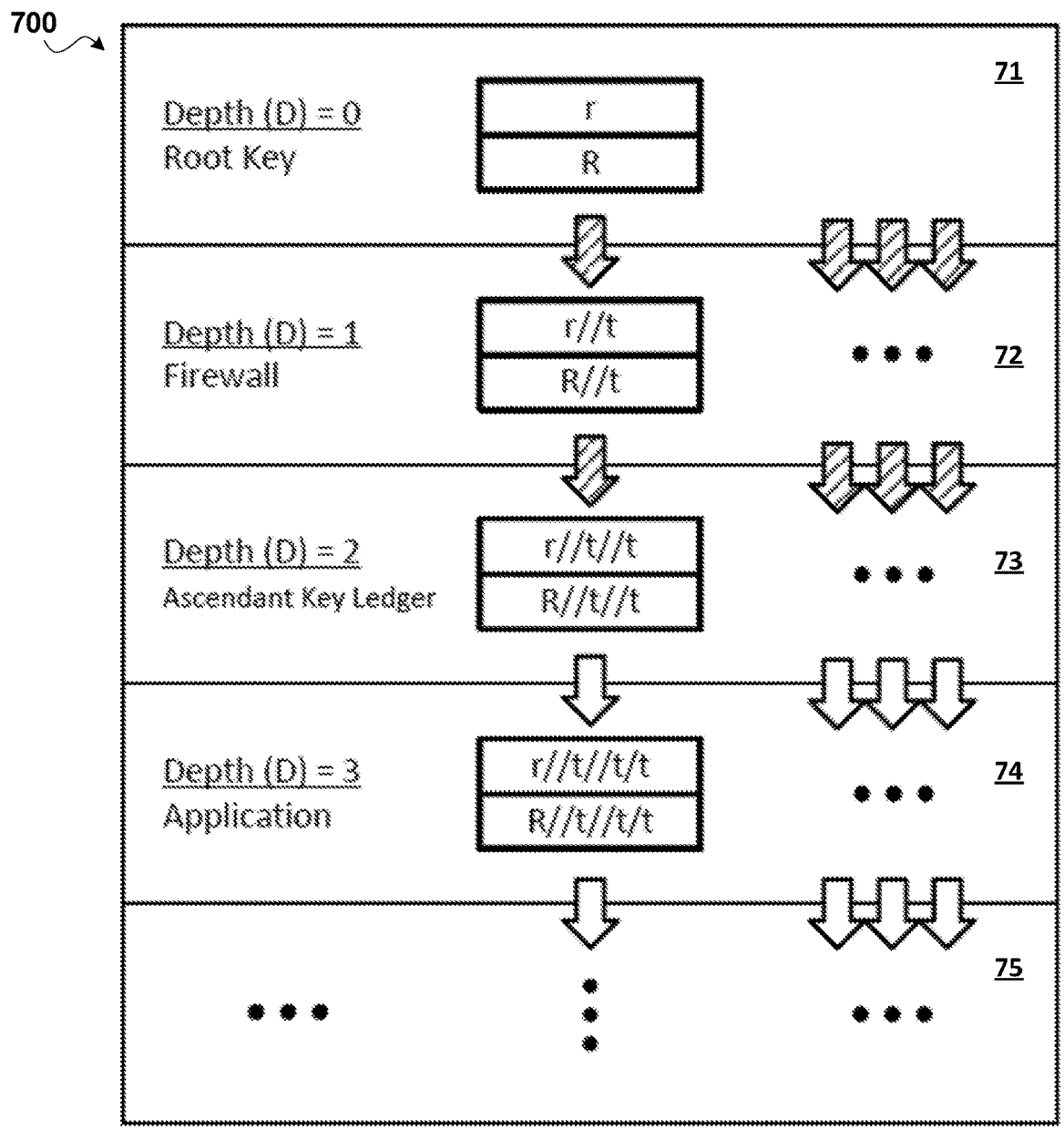
FIG. 7 is a flowchart depicting an example chain of keys used in a key generation and authentication system, in accordance with an embodiment.

FIG. 7 is a flowchart depicting an example chain of keys used in a key generation and authentication system 700, in accordance with an embodiment. The key generation and authentication system 700 can be structurally and/or functionally similar to any of the key generation and authentication systems (e.g., 100) described herein. The chain of keys can be or include, for example, a key derivation hierarchy. The key derivation hierarchy can be generated via a key derivation function. The key derivation function can be implemented by a user, or peer (e.g., trusted party at trusted party compute device 110) to represent an identity of the user, such as in a transaction or interaction with other users, or peers (e.g., relying party at relying party compute device 130).

Each key can be used as a parent key to derive its own child keys, and each child key can further derive its own child keys in an endless progression. Each level in the tree structure is specified by its depth from the root key with the root key having a depth D=0. Keys produced directly from the root key are of depth D=1, each of which may produce keys of depth D=2, and so on. In some implementations, the key generator 141 can be configured to generate one or more derived keys in a hierarchical tree structure ("tree structure"). Thus, different derived keys in the hierarchical tree structure can be used to authenticate the same trusted party to different relying parties.

In other words, the key generation and authentication system (e.g., 100) can be implemented to provide for trusted party key use to represent an identity of and by a first user. Moreover, the key generation and authentication system (e.g., 100) can be implemented to provide for relying party key use, in verifying an authenticity of the identity (e.g., of the first user) by or for a second user, or peer—such as by providing for signature authentication—such as via keys derived in a tree structure, starting with an ascendant key (e.g., root, parent, or ascendant key).

For example, based on and starting with a root key 71, a 0th level of the tree structure, the key generator 141 can be configured to generate, based on the root key 71, one or more derived keys such as of a $1^{st}$ generation of keys—such as at a $1^{st}$ level of the tree structure. The root key 71, at the $0^{th}$ level of the tree structure, serves as a parent key from which the one or more derived keys 72 (at the $1^{st}$ level) can be generated, or derived. The key generator 141 can be configured to generate, or derive, based on one or more of the derived keys at the $1^{st}$ level 72 of the tree structure, one or more derived keys 73 such as of a $2^{nd}$ generation of keys at a $2^{nd}$ level of the tree structure. The key generator 141 can be configured to generate, or derive, based on one or more of the derived keys 73 at the $2^{nd}$ level of the tree structure, one or more derived keys, such as of a 3rd generation of keys 74 at a 3rd level of the tree structure; and so on, such as to a $4^{th}$—or to an $n^{th}$ level of the tree structure, including, for example, one or more derived keys 75 of an $n^{th}$ generation of keys at an $n^{th}$ level of the tree structure, and so on.

In some implementations, a tree structure with which a derived key is associated can include any suitable number of levels, each level being specified or defined in association with one or more derived keys (e.g., of, or derived from a common root, parent, or ascendant key). For example, the tree structure can include a number of levels sufficient to reliably represent a trusted party's identity, such as in a transaction or interaction with one or more relying parties. Stated differently, each level in the tree structure can be specified by its depth from the root key, with the root key having a level, or depth D=0. Keys (e.g., derived, descendent, or child keys) produced directly from the root key (of depth D=0) can be of depth D=1, keys (e.g., derived, descendent, or child keys) produced directly from any one of the keys (of depth D=1) can be of depth D=2; and so on. That is, each key (including the root key) in the tree structure can be used as a parent key from which one or more child keys can be derived, and, similarly, each such derived child key can, in turn, be used as a parent key from which still further child keys can be derived. Thus, different derived keys in the hierarchical tree structure (at the same or different levels) can be used to authenticate the same trusted party to different relying parties.

Figure 8:
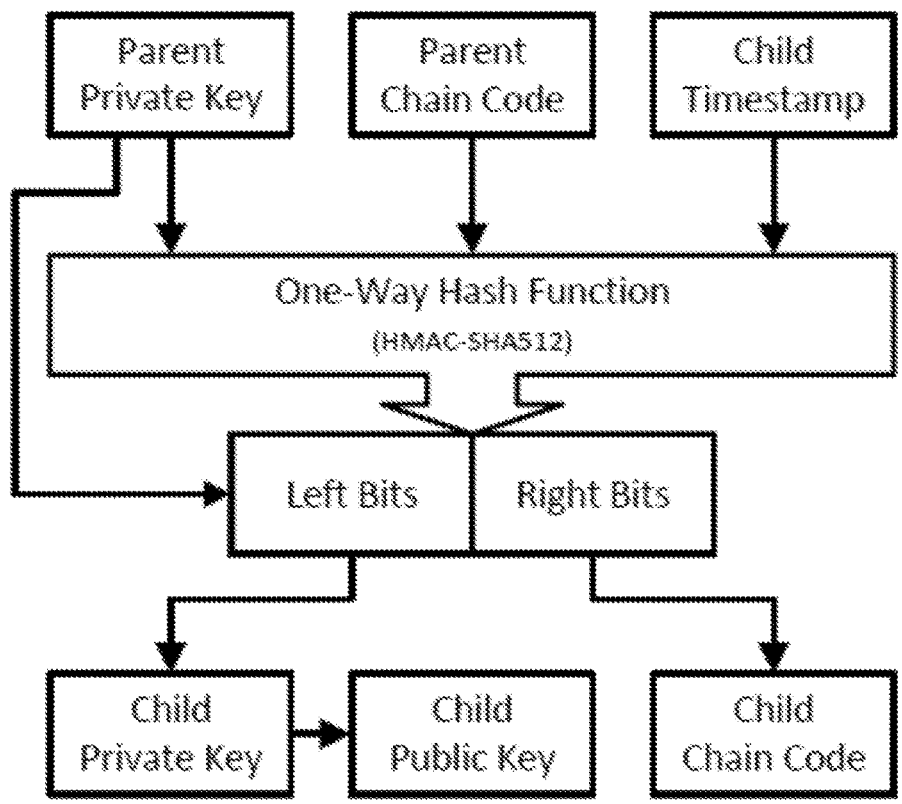
FIG. 8 is a flowchart depicting an example of an internal hardened key derivation function used in a key generation and authentication system, in accordance with an embodiment.

FIG. 8 is a flowchart depicting an example of an internal hardened key derivation function 800 used in a key generation and authentication system, in accordance with an embodiment. The key generation and authentication system can be structurally and/or functionally similar to any of the key generation and authentication systems (e.g., 100) described herein.

In some implementations, the internal hardened child key derivation function 800 can be implemented to generate, based on a parent private key, a derived key having a depth of less than or equal to 2 (D≤2). In such implementations, the internal hardened child key derivation function 800 can be or include, for example, a keyed hash algorithm such as HMAC-SHA512, or the like. In such implementations, the internal hardened child key derivation function 800 can be implemented, for example, by inputting, to the keyed hash algorithm, a parent private key, a parent chain code (e.g., the chain code associated with the parent private key), and a child timestamp. For example, an internal hardened child key derivation function 800 can be implemented, for example, by splitting the output into two 32-byte sequences, left bits (IL) and right bits (IR). The returned child private key kt is IL+kpar (mod n). If a child public key is desired, compute as kt*G. The returned chain code ct is IR. This chain code can be used to generate additional keys from the returned child private key. Generally, any other suitable keyed hash algorithm can otherwise be used to generate the derived key(s), in accordance with embodiments of the present disclosure. Such an internal hardened key derivation function 800 can be used, for example, by a key generator of a trusted party compute device (e.g., key generator 141 of trusted party compute device 110 shown in FIG. 2).

Figure 9:
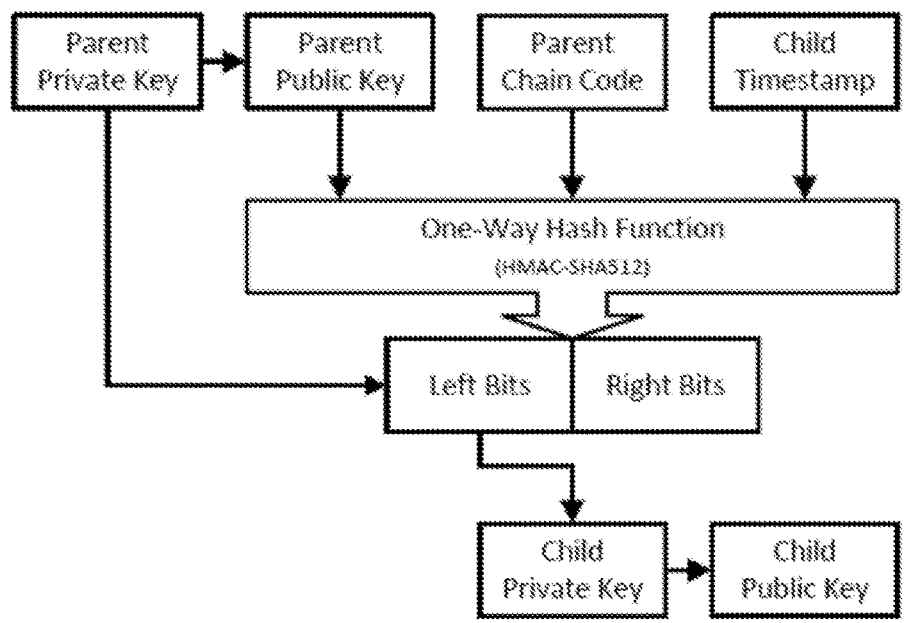
FIG. 9 is a flowchart depicting an example of an internal normal child key derivation function used in a key generation and authentication system, in accordance with an embodiment.

FIG. 9 is a flowchart depicting an example of an internal normal child key derivation function 900 used in a key generation and authentication system, in accordance with an embodiment. The key generation and authentication system can be structurally and/or functionally similar to any of the key generation and authentication systems (e.g., 100) described herein.

In some implementations, the internal normal child key derivation function 900 can be implemented to generate, based on a parent key, a derived key having a depth of greater than 2 (D>2). In such implementations, the internal normal child key derivation function 900 can be or include, for example, a keyed hash algorithm such as HMAC-SHA512, or the like. In such implementations, the internal normal child key derivation function can be implemented, for example, by inputting, to the keyed hash algorithm, a parent public key, a parent chain code (e.g., the chain code associated with the parent public key), and a timestamp. For example, an internal normal child key derivation 900 function can be implemented by splitting the output into two 32-byte sequences, left bits (IL) and right bits (IR). The returned child private key kt is IL+kpar (mod n). If a child public key is desired, compute as kt*G. The returned chain code ct is IR. This chain code can be used to generate additional keys from the returned child private key. Generally, other any suitable keyed hash algorithm can otherwise be used to generate the derived key, in accordance with embodiments of the present disclosure. Such an internal normal key derivation function 800 can be used, for example, by a key generator of a trusted party compute device (e.g., key generator 141 of trusted party compute device 110 shown in FIG. 2).

In some implementations, a symmetric key derivation function can be implemented to generate, based on a private parent or ascendant key, a derived symmetric key. In such implementations, the symmetric key derivation function can be or include, for example, a one-way hash function such as SHA3-512, or the like. In such implementations, the symmetric key derivation function can be implemented, for example, by inputting, to the one-way hash function, a derived private key. In such implementations, output from the symmetric key derivation function can be or include, for example, a string of bits. In such implementations, the string of bits corresponds and can be used as a symmetric key. For example, a parsing of the string of bits can be used as the symmetric key.

Figure 10:
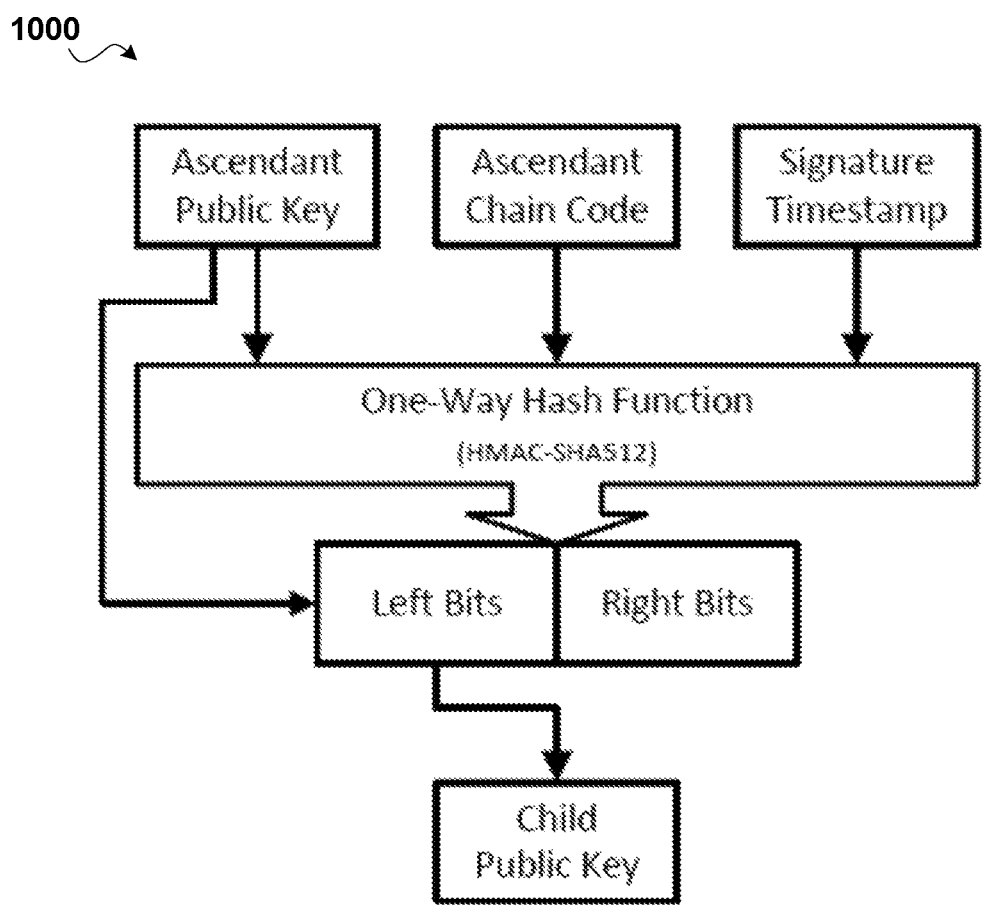
FIG. 10 is a flowchart depicting an example of an external child key derivation function used in a key generation and authentication system, in accordance with an embodiment.

FIG. 10 is a flowchart depicting an example of an external child key derivation function 1000 used in a key generation and authentication system, in accordance with an embodiment. The key generation and authentication system can be structurally and/or functionally similar to any of the key generation and authentication systems (e.g., 100) described herein.

In some implementations, the external child key derivation function 1000 can be implemented to generate, based on a parent key in a public key ledger, a derived key. In such implementations, the external child key derivation function 1000 can be or include, for example, a keyed hash algorithm such as HMAC-SHA512, or the like. In such implementations, the external child key derivation function 1000 can be implemented, for example, by inputting, to the keyed hash algorithm, an ascendant public key, an ascendant chain code (e.g., the chain code associated with the ascendant public key), and a timestamp (or other identifier). The output can be split into two 32-byte sequences, left bits (IL) and right bits (IR). IR can be discarded. The returned child public key Kt is IL+Kpar. Generally, other any suitable keyed hash algorithm can otherwise be used to generate the derived key, in accordance with embodiments of the present disclosure. Such an external child key derivation function 1000 can be used, for example, by a key generator of a relying party compute device (e.g., key generator 161 of relying party compute device 130 shown in FIG. 3).

Figure 11:
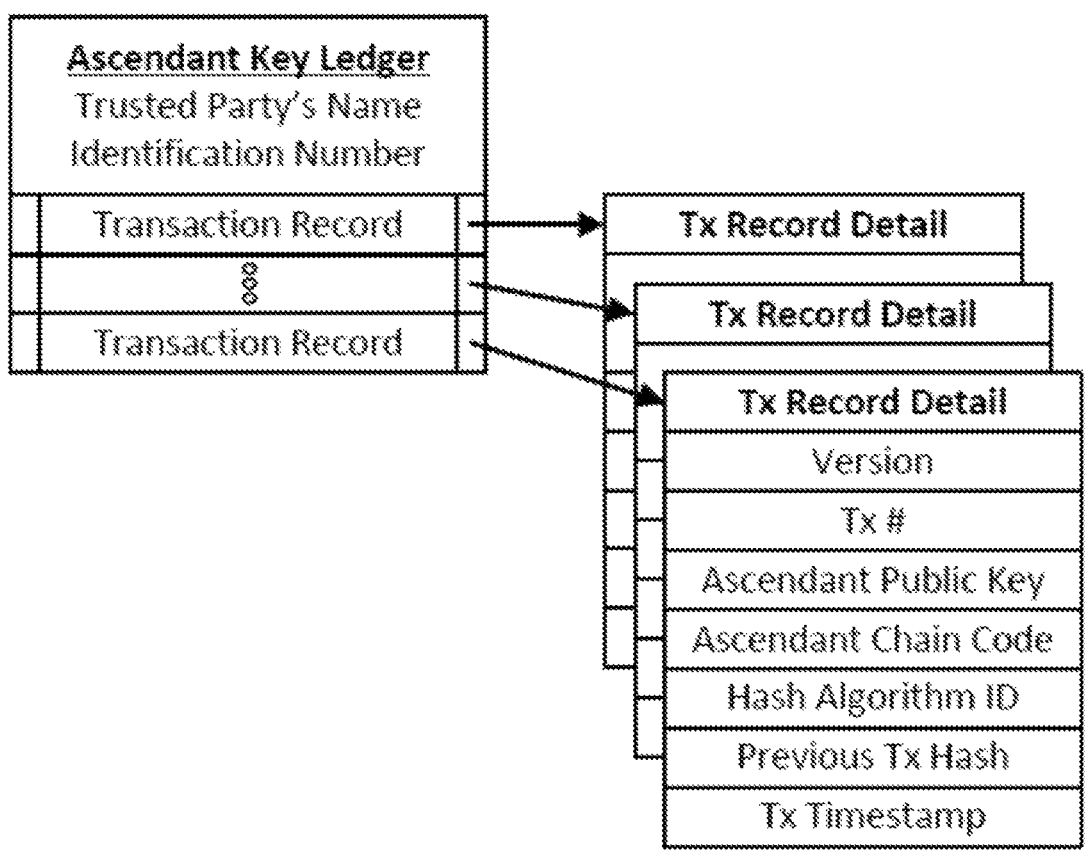
FIG. 11 is a schematic block diagram depicting an example ascendant key ledger used in a key generation and authentication system, in accordance with an embodiment.

FIG. 11 is a schematic block diagram depicting an example ascendant key ledger 1100 used in a key generation and authentication system, in accordance with an embodiment. The key generation and authentication system can be structurally and/or functionally similar to any of the key generation and authentication systems (e.g., 100) described herein.

Ascendant key ledger 1100 (labeled "Ascendant Key Ledger") can be or include a ledger, register, or record of transactions. The ascendant key ledger 1100 can be implemented, for example, by a user or trusted party (e.g., at trusted party compute device 110) for use by a relying party (e.g., at trusted party compute device 130) in authenticating an identity of the user, as described herein. The ascendant key ledger 1100 can be defined by and/or include one or more identifiers including, for example, an identification number and a trusted party's name. In some implementations, the ascendant key ledger 1100 can reside on, or be stored or hosted in a public directory or repository (e.g., hosted by one or more nodes devices 120) or on the trusted party compute device (e.g., 110 of FIG. 1). In some implementations, the ascendant key ledger 1100 can be shared directly between users (e.g., trusted party and relying party).

The ascendant key ledger 1100 can be or include, for example, a ledger, register, log, or record of one or more transactions (labeled "transaction record"). In some instances, transactions can be defined, for example, in terms of a version, a transaction number (labeled "Tx #"), an ascendant public key, an ascendant chain code, a hash algorithm identifier (labeled "Hash Algorithm ID"), a previous transaction hash (labeled "Previous Tx Hash"), and a transaction timestamp (labeled "Tx Timestamp"). In some instances, transactions can be defined, for example, in terms of transaction version, transaction number, transaction timestamp (when the transaction became effective), type of key or key usage, hash algorithm identifier, notation of a key's termination, termination time, and the like.

In some implementations, one or more of the transactions can be defined, for example, by the ascendant public key and ascendant chain code values along with the hash value of the previous transaction. The ascendant key ledger can be configured to be immutable such that the one or more transactions cannot be altered or deleted without detection (e.g., by a relying party). Accordingly, the transactions in the ascendant key ledger 1100 represent a transparent record of transactions that can be difficult for an associated user (e.g. trusted party) to refute. For example, a user (e.g., at trusted party compute device 110) of an ascendant key ledger cannot record a representative public key and later refute that representation by deleting or altering the record. In some implementations, a compute device (e.g., trusted party compute device 110) can be configured to implement a deterministic key derivation function such that write access to the ascendant key ledger is provided by lower level parent keys (e.g., keys at a low depth in a tree hierarchy).

In some implementations, a public key (e.g., the ascendant public key of the ascendant key pair 41*a*) can be posted to a ledger (e.g., trusted party's ascendant key ledger 44*a* of FIG. 4) at any depth (e.g., D>0). In some implementations, a compute device (e.g., trusted party compute device 410 of FIG. 4) can be configured to post the public key (e.g., ascendant public key 41*c* of FIG. 4) with, of, or at a depth D=2 in the ledger, such as to represent an identity of a trusted party of the compute device. In such implementations, the compute device can be configured to generate a parent private key with, of, or at a depth D=1 to authenticate access to the ledger. In some implementations, ascendant public keys (e.g., ascendant public key 41*c* of FIG. 4) recorded in the ledger can be generated via a hardened child key derivation function (e.g., internal hardened child key derivation function). The compute device can be configured to generate the ascendant public keys using the hardened child key derivation function to prevent or preempt a compromised descendent private key from compromising a parent private key. In some implementations, the compute device can be configured to provide read-access (e.g., from trusted party compute device 110, 410 of FIGS. 1 and 4, respectively) directly to a relying party (e.g., at a relying party compute device 130, 430 of FIGS. 1 and 4, respectively). In some implementations, the compute device can be configured to provide the read-access to the relying party (e.g., at a relying party compute device 130, 430 of FIGS. 1 and 4, respectively) via a database such as a public or private directory, or the like.

In some implementations, a user such as a relying party at a compute device (e.g., relying compute device 130 of FIG. 1) can determine a degree or level of integrity of an ascendant key ledger (e.g., of a user at relying compute device 110 of FIG. 1) based on, for example, a hash value of each transaction in the ascendant key ledger. For example, in some implementations, a compute device (e.g., relying compute device 130 of FIG. 1) can be configured to determine a level of integrity of an ascendant key ledger by determining the hash value of each transaction in the ascendant key ledger, and comparing the determined hash values of each transaction with the hash values actually associated with the transactions in the ascendant key ledger. If no discrepancies are detected, it is likely that the transactions contained within the ledger have not been altered and are legitimate. In response to detecting a discrepancy or inconsistency between the determined hash values and the actual hash values of one or more of the transactions, the compute device can be configured to provide a notification indicating a high likelihood of non-legitimacy.

In some implementations, the ascendant key ledger can be configured to enable and provide for a key termination function, such as for execution by a compute device (e.g., trusted compute device 110 of FIG. 1). In some implementations, the compute device can be configured to, for example, execute the key termination function to terminate, delete, remove, or discontinue use of an ascendant public key via the ledger. For example, the compute device can be configured to execute the key termination function to post or record a transaction to the ascendant key ledger, referencing or providing a notation of termination of the ascendant public key, along with a specified termination time. In some implementations, the ascendant key ledger can include a hybrid ledger. The hybrid ledger can be or include, for example, an immutable core with an editable supplemental section.

In some implementations, authentication (e.g., of a signed message, of key usage) can be or include, for example, verifying the owner of the ascendant key ledger, if not previously known; and optionally checking the ledger integrity, as described herein. For example, determining ledger integrity can be or include, for example, determining the hash value of each transaction; and (ii) comparing the results with the Previous Transaction Hash values included in each transaction, as described herein. If each of the computed hash values are equivalent to the recorded Previous Transaction Hash, the ledger integrity is affirmed. In some implementations, authenticating key use further includes, for example, obtaining the relevant ascendant public key from the ascendant key ledger, and verifying the relevant ascendant public key is active and has not been terminated. In some implementations, authenticating key use further includes, for example, deriving the relevant child public key using a key derivation function (e.g., key derivation function 46).

Figure 12:
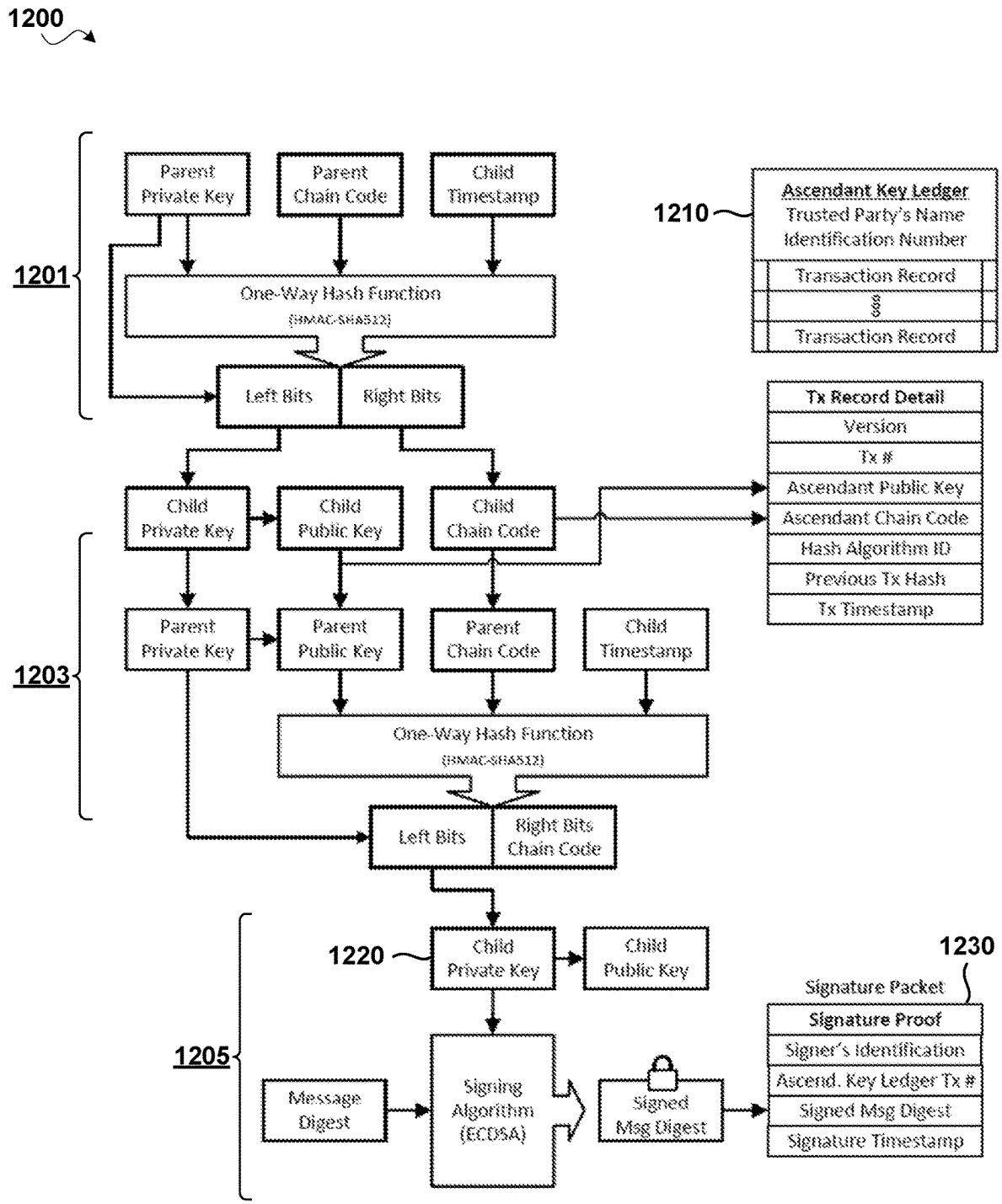
FIG. 12 is a flowchart depicting an example of a key generation and signing method used in a key generation and authentication system, in accordance with an embodiment.

FIG. 12 is a flowchart depicting an example of a key generation and signing method 1200 used in a key generation and authentication system, in accordance with an embodiment. The key generation and authentication system can be structurally and/or functionally similar to any of the key generation and authentication systems (e.g., 100 of FIG. 1) described herein.

The key generation and signing method 1200 can be executed (e.g., at trusted party compute device 110 of FIG. 1) to enable use (e.g., by a trusted party) of a private key (e.g., derived private key 43 of FIG. 4) corresponding to an ascendant public key (e.g., of ascendant key pair 41*a* of FIG. 4) recorded in a public key ledger (e.g., trusted party's ascendant key ledger 44*a* of FIG. 4). For example, use of the private key can include, for example, generating a child key by derivation from the private key based on input of a parent private key, a parent chain code (e.g., the chain code associated with the parent private key), and a child timestamp to a key derivation function (labeled "One-Way Hash Function (HMAC-SHA512)"). The child key can be generated so as to be associated with an identifier (e.g., timestamp) upon generation. The child key can be used (e.g., at trusted party compute device 130) to sign a message. The signed message can be externally authenticated (e.g., at relying party compute device) to thereby provide for trust between a relying party and the trusted party.

For example, the key generation and signing method 1200 can include, at 1201, executing an internal hardened key derivation function (e.g., internal hardened key derivation function 800 of FIG. 8), such as described herein. The output of the internal hardened key derivation function can be a child public key that can be stored with a timestamp (e.g., used to derive a descendant key at 1203) in the ascendant key ledger 1210. In some implementations, the internal hardened key derivation function can also output a child chain code that can be stored with the timestamp and the child public key in the ascendant key ledger 1210. The key generation and signing method 1200 can further include, for example, at 1203, executing an internal normal child key derivation function (e.g., internal normal child key derivation function 900 of FIG. 9) to generate one or more derived, descendent, or child keys from a root, ascendant, or parent key, such as described herein. One or more of the child keys can be or include, for example, child private key 1220. The key generation and signing method 1200 can further include, for example, at 1205, signing a message with the child private key 1220. The message can be signed, for example, via any suitable algorithm, such as a signing algorithm (e.g., Elliptic Curve Digital Signature Algorithm (ECDSA), Rivest-Shamir-Adleman (RSA) and/or the like), or the like. The signed message can be electronically packaged and sent, or otherwise applied (e.g., for external authentication) to an object, such as in the form of a signature packet. The signature packet can be or include, for example, a signature proof such as signature proof 1230. The signature proof 1230 can be or include, for example, signer identifier (labeled "Signer's Identification") such as may be associated with a signer (e.g., the trusted party), ledger transaction identifier such as an ascendant key ledger transaction number (labeled "Ascend. Key Ledger Tx #"), signed message digest (labeled "Signed Msg Digest"), and signature timestamp (labeled "Signature Timestamp"). The signature packet and the timestamp used to derive child private key 1220 can be sent to a relying party compute device to authenticate the trusted party compute device, as described herein.

Figure 13:
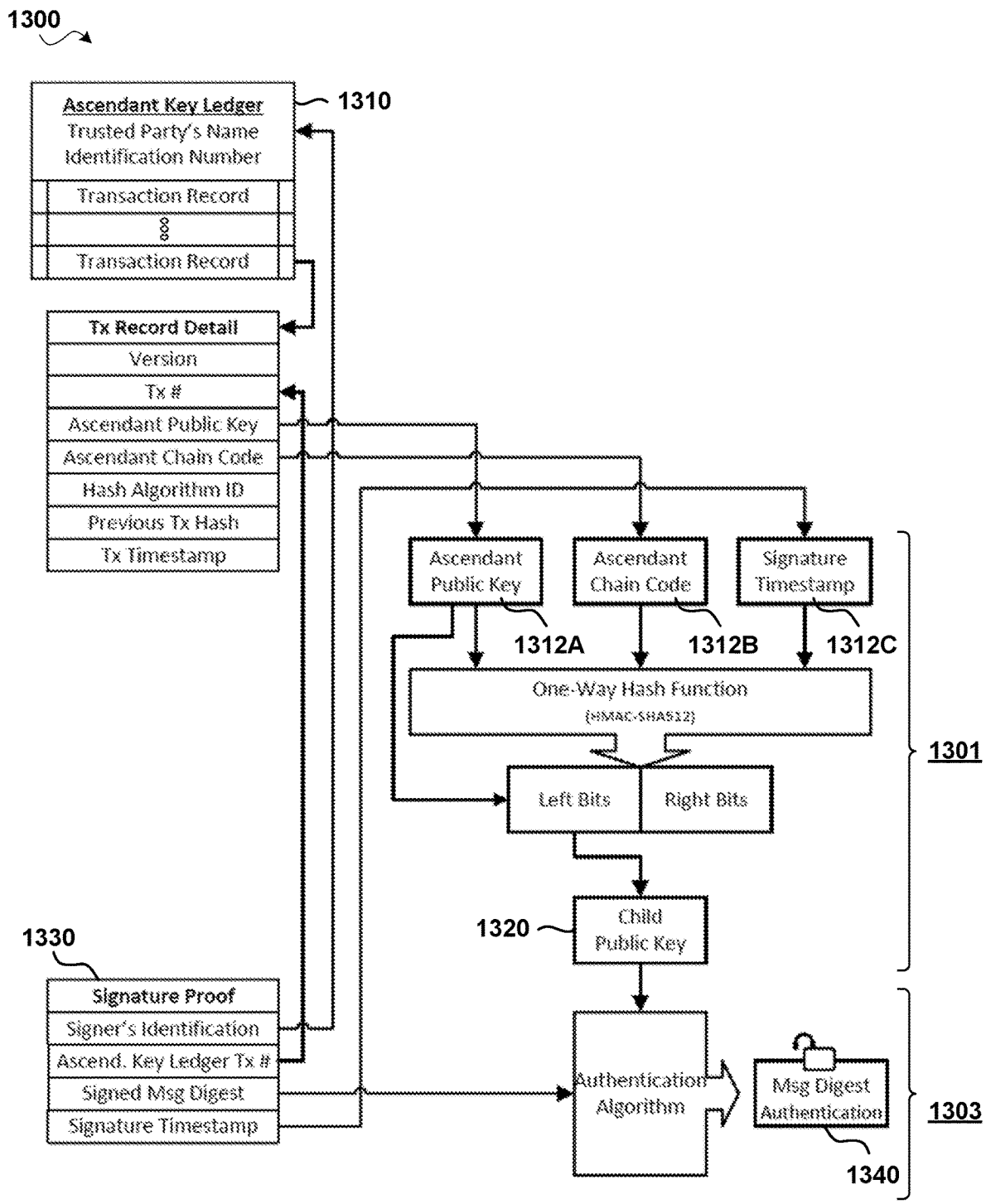
FIG. 13 is a flowchart depicting an example of a key generation and authentication function used in a key generation and authentication system, in accordance with an embodiment.

FIG. 13 is a flowchart depicting an example of a key generation and authentication method 1300 used in a key generation and authentication system, in accordance with an embodiment. The key generation and authentication system can be structurally and/or functionally similar to any of the key generation and authentication systems (e.g., 100 of FIG. 1) described herein.

The key generation and authentication method 1300 can be executed (e.g., at relying party compute device 130 of FIG. 1) to enable authentication and verification (e.g., by a relying party) of, for example, key use, a signed message, and/or the like. For example, the key generation and authentication method 1300 can be executed at relying party compute device 130 with respect to a signed message received at the relying party compute device 130 to authenticate the signed message (e.g., verify identity of sender, requestor, etc.). A compute device such as the relying party compute device 130 can be configured to execute the key generation and authentication method 1300 by generating a derived public (e.g., derived private key 47 of FIG. 4) key associated with an ascendant public key of a trusted party, as described herein.

For example, the key generation and signing method 1300 can include, at 1301, executing an external child key derivation function (e.g., external child key derivation function 1000) to generate one or more derived keys such as child public key 1320, as described herein. The child public key 1320 can be generated by derivation, for example, from a parent key such as ascendant public key 1312A. For example, the external child key derivation function can be executed based on inputs, including, for example, the ascendant public key 1312A, a chain code such as ascendant chain code 1312B (e.g., the chain code associated with the ascendant public key 1312A), and an identifier (e.g., identifier 41b of FIG. 4) such as signature timestamp 1312C (collectively, "input 1312"), such as described herein.

In response to, for example, receiving (e.g., from a trusted party at trusted party compute device 110 of FIG. 1) an electronic message or signature proof such as signature proof 1330 (e.g., corresponding to signature proof 1230), the ascendant public key 1312A, the ascendant chain code 1312B, and the signature timestamp 1312C can be determined or retrieved. The signature proof 1330 can be or include, for example, signer identifier (labeled "Signer's Identification") such as may be associated with a signor (e.g., the trusted party), ledger transaction identifier such as an ascendant key ledger transaction number (labeled "Ascend. Key Ledger Tx #"), signed message digest (labeled "Signed Msg Digest"), and signature timestamp (labeled "Signature Timestamp"). For example, in some instances, the signature proof 1330 corresponds to the signature proof 1330, as described herein with reference to FIG. 12. The ascendant public key 1312A and the ascendant chain code 1312B can be retrieved, for example, from a ledger 1310 (e.g., ascendant key ledger 1100), such as from an entry such as a transaction entry (labeled "Tx Record Detail") in the ledger, as described herein. For example, the ascendant public key 1312A and the ascendant chain code 1312B can be retrieved from an entry in the ledger 1310 based on the ascendant key ledger transaction number associated with the signature proof 1330. The signature timestamp 1312C can be retrieved from the signature proof 1330 based on the signature timestamp.

Upon generating the child public key 1320 via the external child key derivation function, the child public key 1320 and the signed message digest of the signature proof 1330 can be input to any suitable authentication algorithm to authenticate the signature, at 1303. The relying party compute device can then authenticate the trusted party compute device based on a valid signature 1340. In some instances this includes providing to the trusted party compute device, access to resources and/or services associated with the relying party.

Detailed embodiments of the present disclosure have been disclosed herein for purposes of describing and illustrating claimed structures and methods that can be embodied in various forms, and are not intended to be exhaustive in any way, or limited to the disclosed embodiments. Many modifications and variations will be apparent without departing from the scope of the disclosed embodiments. The terminology used herein was chosen to best explain the principles of the one or more embodiments, practical applications, or technical improvements over current technologies, or to enable understanding of the embodiments disclosed herein. As described, details of well-known features and techniques can be omitted to avoid unnecessarily obscuring the embodiments of the present disclosure.

For example, while a timestamp used to generate the descendent keys such as that described herein can be generated at a trusted party compute device, in some instances, the timestamp can instead be generated at the relying party compute device and provided to the trusted party compute device. In such an instance, the trusted party compute device can use the received timestamp to generate a derived private key. The trusted party compute device can also store an ascendant public key in an ascendant key ledger as associated with the timestamp. In such an implementation, because the timestamp is generated by the relying party compute device, the trusted party compute device does not need to provide the timestamp back to the relying party compute device when sending the signed message.

Moreover, while an ascendant public key such as that described herein can be posted in or used to update a ledger (e.g., for later retrieval by a relying party), in some instances, the ascendant public key can instead be sent directly to a relying party compute device. For example, in such instances the trusted party compute device can send the ascendant public key directly to a relying party compute device via a network.

Moreover, while an identifier (e.g., associated with an ascendant public key) such as that described herein can include a timestamp, in some instances, the identifier can instead include, for example, any suitable identifier or ID. For example, in some instances, the identifier can be or include a transaction ID, a serial number, a random number, a nonce, a sequence ID, and/or the like.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

References in this specification to "one embodiment," "an embodiment," "an example embodiment," "some embodiments," and the like, indicate that the embodiment described can include one or more particular features, structures, or characteristics, but it shall be understood that such particular features, structures, or characteristics may or may not be common to each and every disclosed embodiment of the present disclosure herein. Moreover, such phrases do not necessarily refer to any one particular embodiment per se. As such, when one or more particular features, structures, or characteristics is described in connection with an embodiment, it is submitted that it is within the knowledge of those skilled in the art to affect such one or more features, structures, or characteristics in connection with other embodiments, where applicable, whether or not explicitly described.

While some implementations have been described and illustrated herein, a variety of other means and/or structures for performing the function and/or obtaining the results and/or one or more of the advantages is possible. More generally, parameters, dimensions, materials, and configurations described herein are meant to be exemplary and that the actual parameters, dimensions, materials, and/or configurations will depend upon the specific application or applications for which the inventive teachings is/are used. It is, therefore, to be understood that the foregoing embodiments are presented by way of example only and that, within the scope of the appended claims and equivalents thereto; and that embodiments can be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

Also, various concepts can be embodied as one or more methods, of which an example has been provided. The acts performed as part of the method can be ordered in any suitable way. Accordingly, embodiments can be constructed in which acts are performed in an order different than illustrated, which can include performing some acts simultaneously, even though shown as sequential acts in illustrative embodiments.

Although various embodiments have been described as having particular features and/or combinations of components, other embodiments, such as those having a combination of any features and/or components from any of embodiments as discussed above, are possible. For example, some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can be or include, for example, the instructions and/or computer code discussed herein.

What is claimed is:

1. A non-transitory processor-readable medium storing code representing instructions to be executed by a processor, the code comprising code to cause the processor to:
   receive, at a first compute device, (1) a message signed using a signature associated with a derived private key of a second compute device and (2) an identifier;
   retrieve, using the identifier, an ascendant public key associated with the second compute device;
   generate, using a key derivation function with the ascendant public key and the identifier as inputs, a derived public key that is paired with the derived private key; and
   authenticate the second compute device by verifying the signature using the derived public key.

2. The non-transitory processor-readable medium of claim 1, wherein the identifier is a timestamp associated with a time at which the second compute device derived the derived private key using the timestamp and an ascendant private key paired with the ascendant public key.

3. The non-transitory processor-readable medium of claim 1, wherein the identifier is a transaction identifier defined by the second compute device.

4. The non-transitory processor-readable medium of claim 1, wherein the code to cause the processor to retrieve includes code to cause the processor to retrieve the ascendant public key from a key ledger associated with the second compute device using the identifier.

5. The non-transitory processor-readable medium of claim 1, wherein the code to cause the processor to retrieve includes code to cause the processor to retrieve the ascendant public key from a key ledger associated with the second compute device using the identifier,
the key ledger including a plurality of ascendant public keys, each ascendant public key from the plurality of ascendant public keys associated with a different identifier than the remaining ascendant public keys from the plurality of ascendant public keys.

6. The non-transitory processor-readable medium of claim 1, wherein the key derivation function is an external key derivation function, the derived private key being generated by the second compute device using an internal key derivation function.

7. The non-transitory processor-readable medium of claim 1, the code further comprising code to cause the processor to:
grant the second compute device access to resources in response to authenticating the second compute device.

8. An apparatus, comprising:
a memory; and
a processor operatively coupled to the memory, the processor configured to generate a derived private key by inputting to an internal key derivation function a timestamp and an ascendant private key paired with an ascendant public key, the processor is configured to post the ascendant public key as related to the timestamp in a public ledger,
the processor is configured to sign a message using a signature associated with the derived private key to define a signed message, the processor is configured to send the signed message and the timestamp to a relying compute device such that the relying compute device retrieves the ascendant public key from the public ledger using the timestamp, derives a derived public key that is paired with the derived private key, and uses the derived public key to authenticate the signature.

9. The apparatus of claim 8, wherein the derived private key is a first derived private key, the derived public key is a first derived public key, the timestamp is a first timestamp, the message is a first message, the signed message is a first signed message, and the relying compute device is a first relying compute device,
the processor is configured to generate a second derived private key by inputting to the internal key derivation function a second timestamp and the ascendant private key, the processor is configured to post the ascendant public key as related to the second timestamp in the public ledger,
the processor is configured to sign a second message using a signature associated with the second derived private key to define a second signed message, the processor is configured to send the second signed message and the second timestamp to a second relying compute device such that the second relying compute device retrieves the ascendant public key from the public ledger using the second timestamp, derives a second derived public key that is paired with the second derived private key, and uses the second derived public key to authenticate the signature associated with the second derived private key.

10. The apparatus of claim 8, wherein the processor is configured to access resources associated with the relying compute device in response to the relying compute device authenticating the signature.

11. The apparatus of claim 8, wherein the timestamp is associated with a time at which the processor generated the derived private key.

12. The apparatus of claim 8, wherein the public ledger stores a plurality of ascendant public keys associated with the processor, each ascendant public key from the plurality of ascendant public keys is associated with a different timestamp than the remaining ascendant public keys from the plurality of ascendant public keys.

13. The apparatus of claim 8, wherein the derived private key is from a plurality of derived private keys, the processor configured to generate each derived private key from the plurality of derived private keys using a different timestamp and the ascendant private key.

14. The apparatus of claim 8, wherein the derived private key is a first derived private key and the timestamp is a first timestamp,
the processor is configured to generate a second derived private key by inputting to the internal key derivation function a second timestamp and the first derived private key.

15. A method, comprising:
receiving, at a first compute device, a request to authenticate a second compute device, the request including (1) a message signed using a signature associated with a derived private key of the second compute device and (2) a timestamp;
retrieving, using the timestamp and from a public ledger associated with the second compute device, an ascendant public key associated with the second compute device;
generating, using a key derivation function with the ascendant public key as an input, a derived public key that is paired with the derived private key; and
authenticating the second compute device by verifying the signature using the derived public key.

16. The method of claim 15, wherein the timestamp is associated with a time at which the second compute device derived the derived private key using the timestamp and an ascendant private key paired with the ascendant public key.

17. The method of claim 15, wherein the public ledger stores a plurality of ascendant public keys associated with the second compute device, each ascendant public key from the plurality of ascendant public keys associated with a different timestamp than the remaining ascendant public keys from the plurality of ascendant public keys.

18. The method of claim 15, wherein the public ledger is unique to a user of the second compute device.

19. The method of claim 15, further comprising:
granting the second compute device access to resources in response to authenticating the second compute device.

20. The method of claim 15, wherein the key derivation function is an external key derivation function, the derived private key being generated by the second compute device using an internal key derivation function.

* * * * *